US011827529B1

United States Patent
Alnajjar et al.

(10) Patent No.: US 11,827,529 B1
(45) Date of Patent: Nov. 28, 2023

(54) CE AND ZN-DOPED NIFE2O4 CATALYSTS FOR UREA FUEL CELLS

(71) Applicant: KING FAISAL UNIVERSITY, Al-Ahsa (SA)

(72) Inventors: Ahmed Omer Alnajjar, Al-Ahsa (SA); Hany Mohamed Abd El-Lateef Ahmed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/219,614

(22) Filed: Jul. 7, 2023

(51) Int. Cl.
  *H01M 4/00* (2006.01)
  *C01G 53/00* (2006.01)
  *H01M 8/04858* (2016.01)

(52) U.S. Cl.
  CPC ........ *C01G 53/70* (2013.01); *H01M 8/04902* (2013.01); *C01P 2006/16* (2013.01); *C01P 2006/40* (2013.01)

(58) Field of Classification Search
  CPC .. H01M 4/8842; H01M 4/885; H01M 4/8892; H01M 8/16; H01M 8/1286; H01M 4/8663; H01M 4/8621; C04B 35/624; C04B 35/2666; C04B 2235/3284; C04B 2235/3229
  See application file for complete search history.

(56) References Cited

FOREIGN PATENT DOCUMENTS

| CN | 104529428 A | 4/2015 | |
|---|---|---|---|
| CN | 106083024 A | 11/2016 | |
| CN | 106083024 A * | 11/2016 | ......... C04B 35/2666 |

OTHER PUBLICATIONS

Di et al, A Cerium-Zinc Co-Doped NiFe2O4 Nano Powder and Preparation Method Thereof, Nov. 2016, See the Abstract. (Year: 2016).*

Yan, Z & Luo, J., "Effects of Ce Zn co-substitution on structure, magnetic and microwave absorption properties of nickel ferrite nanoparticles" Journal of Alloys and Compounds 695: pp. 1185-1195 (2017).

Karthick, S. et al., "Fabrication of a cerium-doped nickel ferrite solid-state reference electrode and its performance evaluation in concrete environment" Sensors and Actuators B: Chemical 251: pp. 509-523 (2017).

Sharon, V.S. et al., "Superparamagnetic Nickel Ferrite Nanoparticles Doped with Zinc by Modified Sol-gel Method", Journal of Superconductivity and Novel Magnetism 35: pp. 795-804 (2022).

* cited by examiner

Primary Examiner — Cynthia H Kelly
Assistant Examiner — Monique M Wills
(74) Attorney, Agent, or Firm — Nath, Goldberg & Meyer; Richard C. Litman

(57) ABSTRACT

Ce and Zn doped NiFe2O4 materials synthesized via a sol-gel method used as a catalyst. The $NiFe_2O_4$ catalysts doped with Ce and Zn exhibit distinctive electrocatalytic activity towards urea oxidation. The Ce and Zn-doped $NiFe_2O_4$ catalysts can play a critical role as catalytic moderators, accelerating charge transfer in the anodic part of the urea fuel cell (UFC) and potentially improving the efficiency and cost of UFCs. These materials provide a promising approach for developing novel, non-precious electrodes for next-generation fuel technologies.

17 Claims, 3 Drawing Sheets

CE AND ZN-DOPED NIFE2O4 CATALYSTS FOR UREA FUEL CELLS

BACKGROUND

1. Field

The present disclosure relates to new catalysts for improving the efficiency and cost of urea fuel cells, and in particular to Ce and Zn-doped $NiFe_2O_4$ catalysts for use in urea fuel cells.

2. Description Of The Related Art

A fuel cell is an electrochemical apparatus that generates electricity from fuel and oxidant supplied to it. In a fuel cell, the fuel is consumed, and electrons are generated on the anode side. The electrons generated are forced through an external circuit to the cathode, where they react with the oxidant, typically oxygen present in air. The anode and cathode are separated by an electrolyte but are connected by an external circuit through which the electrons generated flow from anode to cathode, thereby allowing electrical power to be harnessed.

During the industrial synthesis of urea, a large amount of wastewater with varying urea concentrations is formed. A large amount of human or animal urine, containing about 2-2.5 wt. % urea, is produced every day. There is a significant level of urea in municipal wastewater, but the available denitrification technologies are expensive and inefficient. It has been reported that hydrogen can be generated from urine or urea-rich wastewater through electrolysis. However, it would be more efficient to generate electricity directly from urine or urea-rich wastewater.

Accordingly, urea has recently emerged as an alternative fuel source for fuel cells, offering a promising solution for the disposal of urea effluent. While treating wastewater is energy-intensive, the biomass component of the effluent, containing urea, can be used as a sustainable fuel source. Urea fuel cells (UFCs) represent a potential technology for extracting urea from waste and generating hydrogen or energy. These electrochemical systems effectively convert urea's chemical energy into electrical energy and offer advantages over conventional fuel cells in terms of storage, transportation, and environmental impact.

With a higher theoretical efficiency than hydrogen-based fuel cells (102.9% versus 83% due to heat absorption), UFCs show great promise. However, challenges still need to be addressed, including the development of highly efficient electrode materials and catalyst poisoning.

Thus, the development of new catalysts for urea fuel cells solving the aforementioned problems are desired.

SUMMARY

The present subject matter relates to Ce and Zn doped NiFe2O4 materials synthesized via a sol-gel method. Characterization of the prepared Ce and Zn doped $NiFe_2O_4$ material as a catalyst was carried out using scanning electron microscopy (SEM) and transmission electron microscopy (TEM). The electrochemical properties of urea oxidation using these catalysts have been investigated through cyclic voltammetry (CV), electrochemical impedance spectroscopy (EIS), and chronoamperometry (CA). The $NiFe_2O_4$ catalysts doped with Ce and Zn exhibit distinctive electrocatalytic activity towards urea oxidation.

Specifically, the anodic current reaches a numerical value of 44.50 mA for 1.5 M urea, with clear peaks observed for the electrooxidation of urea during both forward and reverse sweeps. EIS measurements reveal that the diameter of semicircles is dependent on experimental conditions, and the resistances of charge transfer values are lower in solutions containing urea, indicating excellent urea electrooxidation performance.

The Ce and Zn-doped $NiFe_2O_4$ catalysts can play a critical role as catalytic moderators, accelerating charge transfer in the anodic part of the urea fuel cell (UFC) and potentially improving the efficiency and cost of UFCs. These materials provide a promising approach for developing novel, non-precious electrodes for next-generation fuel technologies.

Accordingly, in an embodiment, the present subject matter relates to a sol-gel method for preparing a Ce and Zn doped $NiFe_2O_4$ material, the method comprising: dissolving cerium (III) nitrate hexahydrate, zinc nitrate hexahydrate, nickel (II) nitrate hexahydrate, and iron (III) nitrate nonahydrate in water to obtain a sol; adding nickel nitrate and zinc nitrate hexahydrate solutions to the sol, followed by adding cerium (III) nitrate to the sol; adding a capping agent to the sol to form complexes with metal ions therein; slowly adding a base ammonium hydroxide to the sol with constant stirring until the sol reaches a pH of about 9, thereby forming a gel; aging the gel at room temperature for at least about 2 hours to obtain a uniform gel; drying the uniform gel to obtain a dried gel; combusting the dried gel for about one hour at a temperature of about 160° C. to about 180° C. to obtain a burned gel; and calcinating the burned gel at a temperature of about 425° C. to about 475° C. for at least about 3 hours to obtain the Ce and Zn doped $NiFe_2O_4$ material.

In another embodiment, the present subject matter relates to a Ce and Zn doped $NiFe_2O_4$ material prepared according to the sol gel method as described herein.

In a further embodiment, the present subject matter relates to an electrode for use in a urea fuel cell comprising a catalyst comprising the Ce and Zn doped $NiFe_2O_4$ material as described herein.

In still another embodiment, the present subject matter relates to a urea fuel cell, comprising an electrode as described herein.

These and other features of the present subject matter will become readily apparent upon further review of the following specification.

DETAILED DESCRIPTION OF THE PREFERRED EMBODIMENTS

Figures 1A, 1B, 1C, 1D:
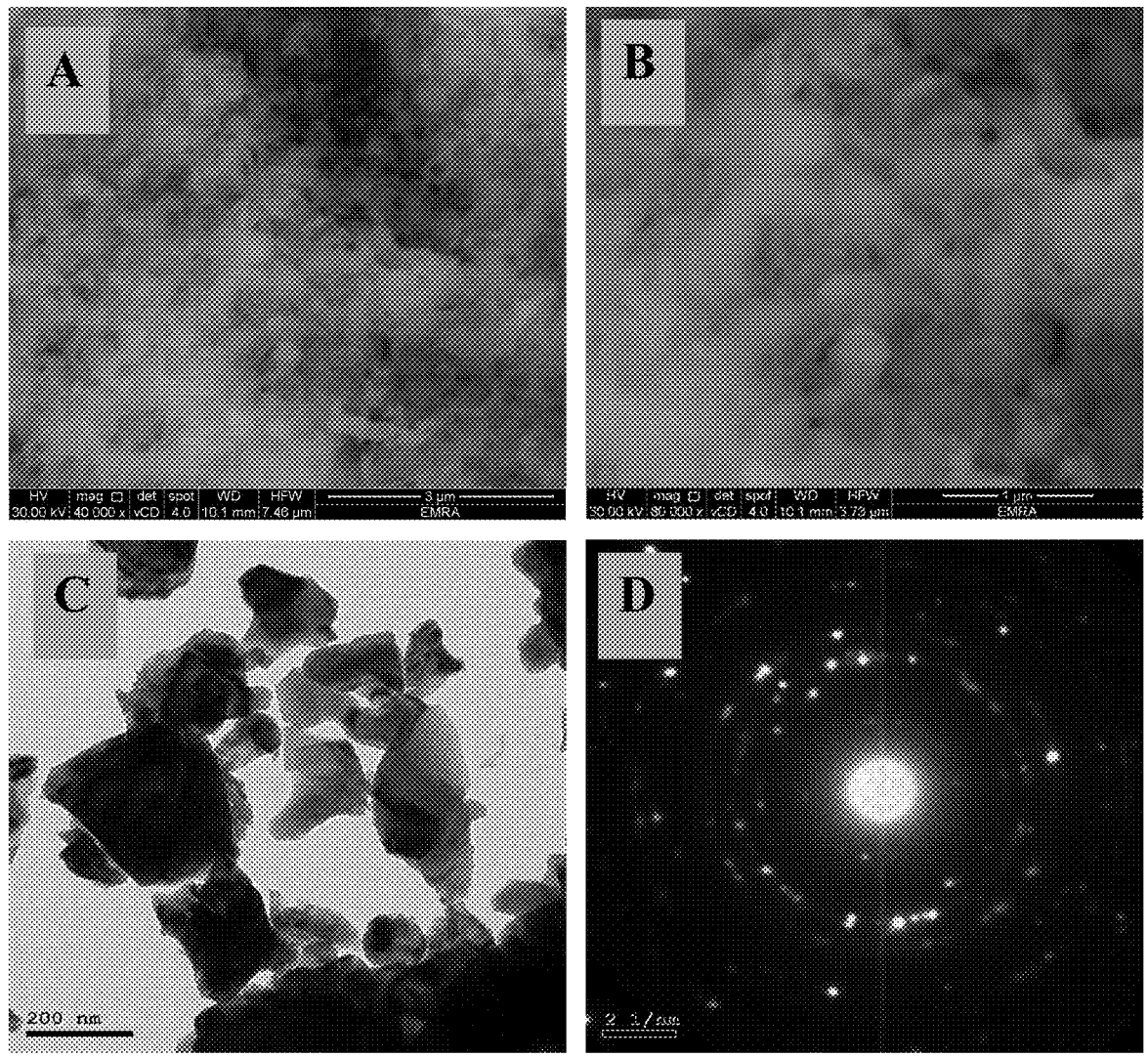
FIGS. 1A-D show SEM images at different magnifications 40 and 80 KX (FIG. 1A, FIG. 1B, respectively), TEM (FIG. 1C), and SAED (FIG. 1D) of the present Ce and Zn doped $NiFe_2O_4$ material.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a sol-gel method for preparing a Ce and Zn doped $NiFe_2O_4$ material, the method comprising: dissolving cerium (III) nitrate hexahydrate, zinc nitrate hexahydrate, nickel (II) nitrate hexahydrate, and iron (III) nitrate nonahydrate in water to obtain a sol; adding nickel nitrate and zinc nitrate hexahydrate solutions to the sol, followed by adding cerium (III) nitrate to the sol; adding a capping agent to the sol to form complexes with metal ions therein; slowly adding a base ammonium hydroxide to the sol with constant stirring until the sol reaches a pH of about 9, thereby forming a gel; aging the gel at room temperature for at least about 2 hours to obtain a uniform gel; drying the uniform gel to obtain a dried gel; combusting the dried gel for about one hour at a temperature of about 160° C. to about 180° C. to obtain a burned gel; and calcinating the burned gel at a temperature of about 425° C. to about 475° C. for at least about 3 hours to obtain the Ce and Zn doped $NiFe_2O_4$ material.

In this regard, the formed complexes with the metal ions can prevent the metal ions from precipitating out of the sol.

In another embodiment, the capping agent used in the present methods can be ethylenediaminetetraacetic acid (EDTA). In certain embodiments, the EDTA can be dissolved in water before being added to the sol.

In an embodiment, the dried gel can be combusted for about one hour or longer at a temperature of about 160° C. to about 180° C., about 160° C., about 165° C., about 170° C., about 175° C., about 180° C., or about 170° C., to obtain the burned gel In a further embodiment, the burned gel can be calcined at a temperature of about 425 to about 475° C., about 425° C., about 430° C., about 435° C., about 440° C., about 445 ° C., about 450° C., about 455° C., about 460° C., about 465° C., about 470 ° C., about 475 ° C., or about 450° C. In certain embodiments, the calcination step can be conducted for at least about 3 hours, for about hours, for about 4 hours, for about 5 hours, or longer.

In certain embodiments, this combustion followed by calcination at the relatively high temperatures is critical to providing the advantages of the present methods. While these temperatures are relatively high, they are much lower than those employed by the currently known methods, saving on energy usage and/or consumption in preparing the present products, as well as resulting in an overall easier to use method. Further, the use of these specific combustion and calcination steps contribute to obtaining a stable and distinct spinel structure of the nickel-ferrite material, at a "low temperature" (compared to prior art methods) suitable for user application.

In other embodiments, about 0.1 M of the cerium (III) nitrate hexahydrate, zinc nitrate hexahydrate, nickel (II) nitrate hexahydrate, and iron (III) nitrate nonahydrate can be dissolved in the water to obtain the sol. In an embodiment, the water can be distilled water, or bidistilled water. In another embodiment, the solution can be stirred until all the nitrates are completely dissolved.

In an embodiment, prior to being dried, the uniform gel can be sealed. It can then be dried at about 75° C. to about 85° C., about 75° C., about 76° C., about 77° C., about 78° C., about 79° C., about 80° C., about 81° C., about 82° C., about 83° C., about 84° C., about 85° C., or about 80° C., to remove any solvent and residual water and obtain the dried gel.

In certain embodiments, the cerium (III) nitrate is added in a stoichiometric ratio prior to the addition of the EDTA.

The present sol gel methods can result in a product having higher purity and homogeneity, as well as increased control over particle size, shape, distribution, and morphology, along with the capability to customize the surface chemistry of the nanoparticles for the intended application. than is available according to currently known methods. Further, using capping agents and bases in the present sol gel process can help control the composition and properties of the final Ce/Zn—Ni-ferrite material.

In another embodiment, the present subject matter relates to a Ce and Zn doped $NiFe_2O_4$ material prepared according to the sol gel method as described herein.

In certain embodiments, the Ce and Zn doped $NiFe_2O_4$ material can have the composition $Ce_xZn_xNi_{(1-x)}Fe_2O_4$. In additional embodiments, the Ce and Zn doped $NiFe_2O_4$ material can have a surface with a porous, sponge-like structure with irregularly shaped pores. In this regard, the irregularly shaped pores can have a variable size with an average diameter of about 490 nm to about 510 nm, about 490 nm, about 495 nm, about 500 nm, about 505 nm, about 510 nm, or about 500 nm. Further, the Ce and Zn doped $NiFe_2O_4$ material can be polycrystalline.

The formation of a porous network in the present Ce and Zn doped $NiFe_2O_4$ material can be attributed to substantial release of gaseous products during the combustion and calcination processes described herein.

In a further embodiment, the present subject matter relates to an electrode for use in a urea fuel cell comprising a catalyst comprising the Ce and Zn doped $NiFe_2O_4$ material as described herein. In certain embodiments, the electrode can be a glassy carbon electrode (GCE).

In this regard, the electrode can be an anode. Further, the anode can produce an anodic current of 44.50 mA for 1.5 M urea. In addition, the anode can electrooxidize urea during both forward and reverse sweeps.

In certain embodiments, the catalyst comprising the Ce and Zn doped $NiFe_2O_4$ material, when placed in a urea fuel cell, can be configured to accelerate charge transfer in an anodic part of the urea fuel cell. In this regard, an anodic current density passing through the electrode can increase as a concentration of urea in the urea fuel cell increases up to a urea concentration of 1.5 M. The $NiFe_2O_4$ catalysts doped with Ce and Zn can exhibit distinctive electrocatalytic activity towards urea oxidation. The diameter of semicircles may be dependent on experimental conditions, and the resistances of charge transfer values may be lower in solutions containing urea, indicating excellent urea electrooxidation performance.

In still another embodiment, the present subject matter relates to a urea fuel cell, comprising an electrode as described herein.

In addition, in the urea fuel cell, there can be three resistances, one for the electrolyte, the second for the catalyst reaction, and the third for the urea oxidation to nitrogen and $CO_2$, which involves the transfer of six electrons. The third process is only present in the presence of urea, which can explain the presence of semicircles in the $Ce_xZn_xNi_{(1-x)}Fe_2O_4$ electrode.

Accordingly, the present subject matter relates to a prototype urea fuel cell using inexpensive catalysts, namely $Ce_xZn_xNi_{(1-x)}Fe_2O_4$, and a non-toxic and readily available renewable fuel supply. The use of this catalyst can significantly enhance the current density, thereby facilitating the commercialization of urea fuel cells.

To boost electrocatalytic activity, the doped metal atom can establish a new catalytically active site by lowering the binding energy with an oxygen molecule due to its distinct sponge amorphous texture. An ideal ratio of Ni, Zn, and Ce can promote stronger bonds between the active metal ion and the oxygenous intermediate, which can improve OER activity. The $Ce_xZn_xNi_{(1-x)}Fe_2O_4$ catalyst can play a critical role as a catalytic moderator, accelerating charge transfer in the anodic part of the urea fuel cell (UFC) and potentially improving the efficiency and cost of UFCs.

In an embodiment, a method of operating a urea fuel cell (UFC) can include providing the electrode as described herein in the fuel cell and contacting the electrode with urea. The electrode can be an efficient catalyst for urea oxidation. The present teachings are illustrated by the following examples.

EXAMPLES

Example 1

Preparation of Ce and Zn Doping $NiFe_2O_4$ materials

The sol-gel auto-combustion method was used to synthesize Ce and Zn doped $NiFe_2O_4$ materials according to the composition $Ce_xZn_xNi_{(1-x)}Fe_2O_4$. The sol-gel method offers several advantages over other conventional synthesis methods, such as high purity, homogeneity, particle size, and morphology control. Using capping agents and bases in the sol-gel process can also help control the composition and properties of the final Ce/Zn—Ni-ferrite material. Ce/Zn—Ni-ferrites were prepared by the sol-gel method as follows:

Preparation of the sol: In a beaker, the required amount of metal nitrates (0.1 M) (Cerium(III) nitrate hexahydrate, Zinc nitrate hexahydrate, Nickel(II) nitrate hexahydrate, and Iron (III) nitrate nonahydrate) were dissolved in bidistilled water. The solution was stirred until all the nitrates were completely dissolved.

Gel formation: Nickel nitrate and Zinc nitrate hexahydrate solutions were added while the iron nitrate solution was stirred. Thereafter, a stoichiometric ratio of Cerium(III) nitrate was added, followed by a measured amount of ethylenediaminetetraacetic acid (EDTA) dissolved in 10 ml of distilled water as a capping agent. The capping agent formed complexes with the metal ions and prevented them from precipitating out of the solution. Then, slowly a suitable amount of a base ammonium hydroxide (NH$_4$OH) was added to the solution with constant stirring until the pH of the solution reached around 9. This produced a gel.

Aging and drying: The gel was then aged at room temperature for 2 hours to promote the formation of a more stable and uniform gel. The gel was sealed and then dried at a temperature of around 80° C. to remove the solvent and any residual water.

Calcination: The dried gel was burned for an hour at 170° C. then calcined at a high temperature of around 450° C. for 3 hours to form the final Ce/Zn—Ni-ferrite material.

Example 2

Characterization of Ce and Zn Doping NiFe$_2$O$_4$ Materials by SEM and TEM, and SAED Analysis The surface morphology of the prepared Ce and Zn doped NiFe$_2$O$_4$, which was calcined at 450° C., was studied with SEM and TEM techniques. The SEM micrographs at different magnifications; 40, and 80 40 KX are shown in FIGS. 1A and 1B. The surface features a porous, sponge-like structure characterized by irregularly shaped pores. The pore diameters are variable, with an average size of approximately 500 nm. The formation of a porous network can be attributed to the substantial release of gaseous products during the combustion process at 170° C. and the subsequent calcination process at 450° C. This is a common characteristic of materials synthesized through combustion and calcination steps.

The Selected Area Diffraction (SAED) and TEM were studied as displayed in FIGS. 1C and 1D. In the case of the SAED, the pattern displays small, bright spots arranged in ring-like formations around a central spot of varying diameters, indicating that the Ce$_x$Zn$_x$Ni$_{(1-x)}$Fe$_2$O$_4$ material is polycrystalline in nature. In the TEM picture (FIG. 1C), the lattice fringes were measured and found to be 0.265 nm, 0.210 nm, and 0.180 nm, which correspond to the crystal planes (311), (400), and (422), respectively.

Example 3

Electrocatalytic Oxidation of Urea

Figure 2:
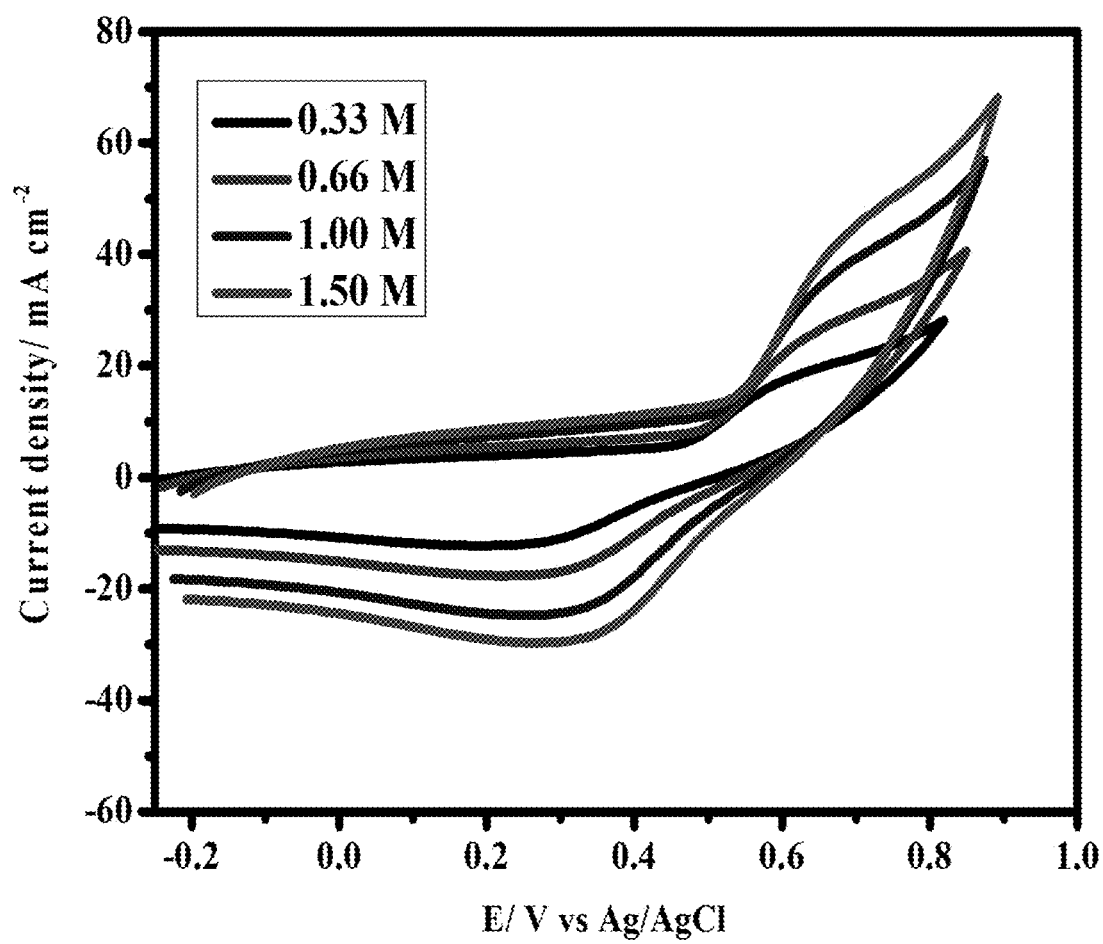
FIG. 2 is a chart showing cyclic voltammetry (CV) responses of a present $Ce_xZn_xNi_{(1-x)}Fe_2O_4$@GC (glassy carbon) electrode in 1.0 M KOH solution containing various concentrations of urea at a scan rate of 50.0 mV s$^{-1}$.

In FIG. 2, the cyclic voltammetry (CV) response of a Ce$_x$Zn$_x$Ni$_{(1-x)}$Fe$_2$O$_4$@glassy carbon electrode (GCE) in 1.0 M potassium hydroxide solution with varying concentrations of urea is shown. The results indicate that the presence of urea leads to a significant increase in the anodic current density (b), providing evidence of strong electrocatalytic activity. This suggests that the addition of urea to the electrolyte solution enhances the ability of the electrode to facilitate the transfer of electrons during redox reactions at the electrode surface.

Moreover, as the concentration of urea in the potassium hydroxide solution increased, there was a corresponding increase in the anodic current density ($I_P$), as shown in FIG. 2. This can be attributed to the higher concentration of urea species available for electrooxidation.

The results demonstrate that the $I_P$ of urea increases with the concentration of urea, as evidenced by the observed trend in FIG. 2. However, it should be noted that the increase in $I_P$ was only significant up to a certain concentration of urea (around 1.5 M), beyond which the effect may saturate or even decrease.

Increasing the concentration of urea results in a higher anodic current density ($I_P$) due to the oxidation of a larger amount of adsorbed urea on the interface of Ce$_x$Zn$_x$Ni$_{(1-x)}$Fe$_2$O$_4$/GC. However, the coverage of adsorbed OH$^-$ species on the Ce$_x$Zn$_x$Ni$_{(1-x)}$Fe$_2$O$_4$ interface is reduced due to the high surface coverage of urea. As a result, the oxidation of Ni(II) to Ni(III) can only be completed by shifting the electrode potential ($E_P$) to a more positive direction. Overall, these findings may have important implications for the development of more efficient electrochemical devices and processes.

Example 4

Electrochemical Impedance Spectroscopy (EIS)

Figure 3:
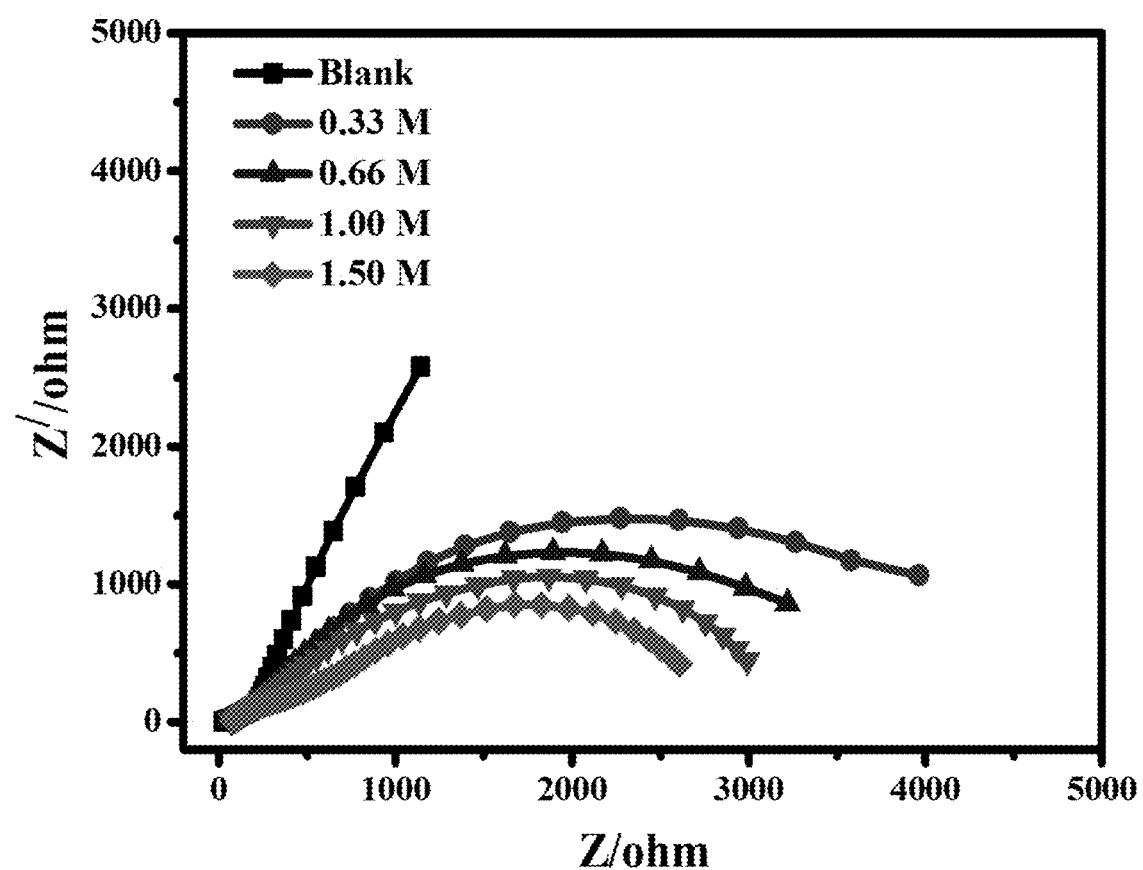
FIG. 3 is a chart showing electrochemical impedance spectroscopy (EIS) measurements of a present $Ce_xZn_xNi_{(1-x)}Fe_2O_4$@GC (glassy carbon) electrode in 1.0 M KOH solution containing various concentrations of urea.

FIG. 3 presents the results of electrochemical impedance spectroscopy (EIS) measurements of the Ce$_x$Zn$_x$Ni$_{(1-x)}$Fe$_2$O$_4$ material prepared in the absence and presence of various concentrations of urea in aqueous KOH. The Nyquist plot for the sample without urea exhibited a straight line without any semicircle, indicating a limited transfer pathway in the potassium hydroxide electrolyte. In contrast, the addition of urea to the solution resulted in a decrease in the semicircle diameter and the polarization resistance ($R_p$), which was observed up to a urea concentration of 1.50 M. This reduction in $R_p$ value may be attributed to the enhancement of charge transfer kinetics (lowering $R_p$), owing to the higher rates of urea electrocatalytic oxidation.

It is to be understood that the methods of making the Ce and Zn-doped NiFe$_2$O$_4$ catalysts and the catalysts themselves are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A sol-gel method for preparing a Ce and Zn doped NiFe$_2$O$_4$ material, the method comprising:
   dissolving cerium (III) nitrate hexahydrate, zinc nitrate hexahydrate, nickel (II) nitrate hexahydrate, and iron (III) nitrate nonahydrate in water to obtain a sol;
   adding nickel nitrate and zinc nitrate hexahydrate solutions to the sol, followed by adding cerium (III) nitrate to the sol;
   adding a capping agent to the sol to form complexes with metal ions therein;
   slowly adding a base ammonium hydroxide to the sol with constant stirring until the sol reaches a pH of about 9, thereby forming a gel;
   aging the gel at room temperature for at least about 2 hours to obtain a uniform gel;
   drying the uniform gel to obtain a dried gel;
   combusting the dried gel for about one hour at a temperature of about 160° C. to about 180° C. to obtain a burned gel; and
   calcinating the burned gel at a temperature of about 425 to about 475° C. for at least about 3 hours to obtain the Ce and Zn doped NiFe$_2$O$_4$ material.

2. The method of claim 1, wherein the formed complexes with the metal ions prevent the metal ions from precipitating out of the sol.

3. The method of claim 1, wherein the capping agent is ethylenediaminetetraacetic acid (EDTA).

4. The method of claim 1, wherein the burned gel is calcined at a temperature of about 450° C.

5. The method of claim 1, wherein about 0.1 M of the cerium (III) nitrate hexahydrate, zinc nitrate hexahydrate, nickel (II) nitrate hexahydrate, and iron (III) nitrate nonahydrate are dissolved in the water to obtain the sol.

6. The method of claim 1, wherein the uniform gel is dried at about 75° C. to about 85 ° C. to remove any solvent and residual water and obtain the dried gel.

7. A Ce and Zn doped $NiFe_2O_4$ material prepared according to the method of claim 1.

8. The Ce and Zn doped $NiFe_2O_4$ material of claim 7, wherein the Ce and Zn doped $NiFe_2O_4$ material has a surface with a porous, sponge-like structure with irregularly shaped pores.

9. The Ce and Zn doped $NiFe_2O_4$ material of claim 8, wherein the irregularly shaped pores have an average diameter of about 490 to about 510 nm.

10. The Ce and Zn doped $NiFe_2O_4$ material of claim 7, wherein the Ce and Zn doped $NiFe_2O_4$ material is polycrystalline.

11. An electrode for use in a urea fuel cell comprising a catalyst comprising the Ce and Zn doped $NiFe_2O_4$ material of claim 7.

12. The electrode of claim 11, wherein the electrode is an anode.

13. The electrode of claim 12, wherein the anode produces an anodic current of 44,50 mA for 1.5 M urea.

14. The electrode of claim 12, wherein the anode electrooxidizes urea during both forward and reverse sweeps.

15. The electrode of claim 12, wherein the catalyst comprising the Ce and Zn doped $NiFe_2O_4$ material, when placed in a urea fuel cell, is configured to accelerate charge transfer in an anodic part of the urea fuel cell.

16. The electrode of claim 15, wherein an anodic current density passing through the electrode increases as a concentration of urea in the urea fuel cell increases up to a urea concentration of 1.5 M.

17. A urea fuel cell, comprising the electrode of claim 11.

* * * * *